Patented Mar. 28, 1939

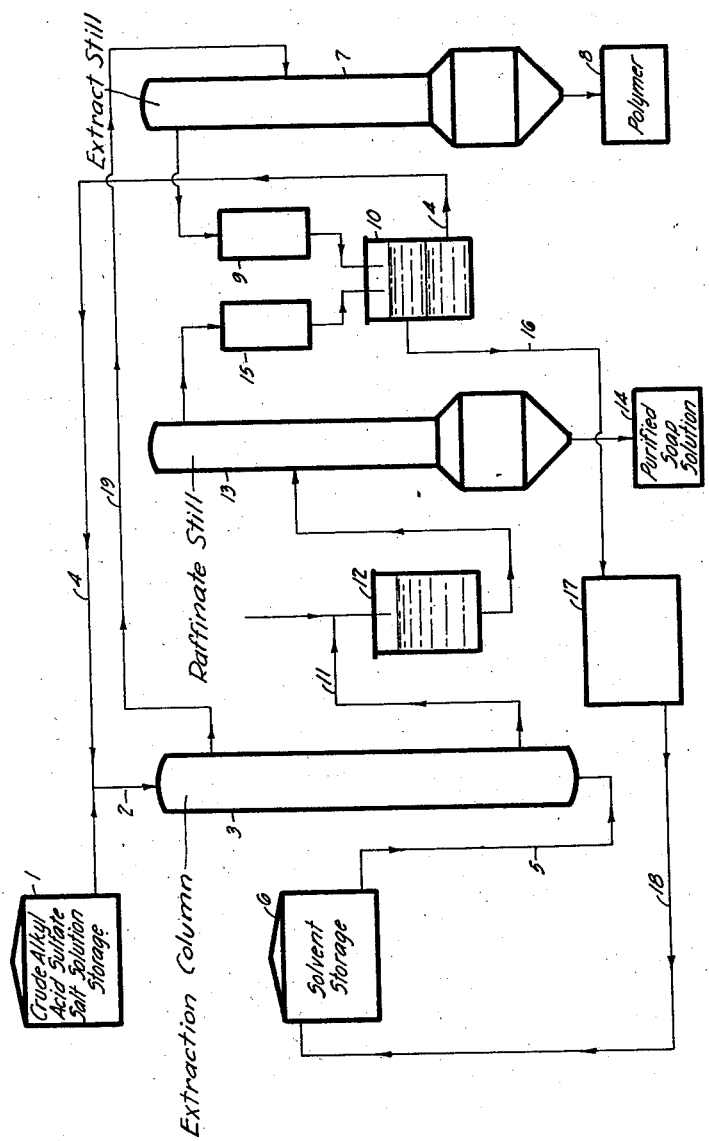

2,152,162

UNITED STATES PATENT OFFICE 2,152,162

PURIFICATION OF AQUEOUS SOLUTIONS OF ALIPHATIC ESTERS OF POLYBASIC INORGANIC ACIDS

Anton Johan Tulleners, Amsterdam, Netherlands, assignor to Shell Development Company, San Francisco, Calif., a corporation of Delaware Application December 12, 1936, Serial No. 115,563
In the Netherlands December 24, 1935

5 Claims. (Cl. 260—459)

This invention relates to the purification of water soluble capillary-active acid esters of polybasic acids and salts thereof, such, for example, as the alkyl acid sulfates of eight or more carbon atoms and their salts, and the like, and, more specifically, is concerned with those methods wherein such capillary-active substances are in aqueous solution.

The primary object of my invention is the removal from such aqueous solutions of undesirable admixtures, such as polymers, unreacted hydrocarbons, and the like which may be present as impurities acquired during manufacture or in use of the said capillary-active substances. Another object of the invention is the extraction of such impurities by means of a solvent which avoids the formation of emulsions during extraction.

Repeated attempts have been made to produce water soluble capillary-active salts of alkyl acid sulfates and the like in a pure form, free of hydrocarbons such, for example, as the polymers which are invariably formed in the manufacture of alkyl sulfuric acid esters by reaction of olefines of eight or more carbon atoms per molecule with sulfuric acid. But because the compounds involved are powerful emulsifying agents great difficulty has been experienced in effecting adequate separation of impurities without excessive losses of valuable material.

I have now found that capillary-active acid esters of polybasic acids and salts thereof can be easily stripped of undesirable admixtures in a simple manner which requires no rigid control, by extracting aqueous solutions thereof with a lower boiling hydrocarbon or hydrocarbon mixture in the presence of one or more lower boiling, oxygen-containing organic compounds whereby the formation of emulsions is prevented.

The process is particularly suitable for the purification of aqueous solutions of acid alkyl sulfates unsaturated hydrocarbons and alcohols, that is, the water soluble sulfuric acid compounds of those aliphatic and carbocyclic compounds which yield alkyl sulfuric acids or analogous compounds or the water soluble salts of any of these compounds. While aqueous solutions of such acid alkyl sulfates form the preferred material for purification by my novel procedure, my invention is not limited thereto as similar solutions of the corresponding derivatives of other polybasic acids, such, for example, as the acids of phosphorus and the like, may be treated in an analogous manner. Any suitable method may be used for the preparation of these capillary-active compounds including sulfation with agents such as aqueous or anhydrous sulfuric acid, sulfur trioxide, chlorsulfonic acid, etc., with or without conversion of the resulting acid products to salts by treatment with basic agents whether organic or inorganic. Typical capillary-active compounds which may be purified by the process of my invention are for example, normal and/or iso, primary, secondary or tertiary alkyl acid sulfates of eight or more carbon atoms per molecule, and the water soluble salts of such acid esters including, for example, the alkali metal, ammonium, alkaline earth metal, and like inorganic salts, the organic salts such as are obtained by neutralization of the acid compounds with aliphatic or aromatic amines, or alkylolamines, or other suitable nitrogen bases, etc.

Suitable lower boiling hydrocarbons which may be used as extractants in the process of my invention include pure hydrocarbons such, for example, as benzene, pentane, hexane, di-isobutylene, etc., as well as hydrocarbon mixtures such as gasoline and the like. It is preferable to choose hydrocarbons which may be readily separated by distillation from the extracts obtained in the purification step and to facilitate this they should most preferably have a boiling point or boiling range lower than that of the lowest boiling impurity which it is desired to remove. They should, preferably, not have too low a boiling point, however, as difficulties in recovery may be thereby incurred. The hydrocarbons preferably used in the process generally boil below about 160° C. and most preferably between about 70° C. and about 140° C., although lower or higher boiling hydrocarbons may in some cases be suitable depending upon the character of the impurities involved; thus even normally gaseous hydrocarbons may be used when the process is carried out under suitable superatmospheric pressure.

Typical lower boiling oxygen-containing compounds which may be used to prevent emulsification during extraction are, for example, alcohols, ethers, esters, ketones and the like. The presence of such compounds as these permits a clean and rapid separation of extract and raffinate and not only avoids losses resulting from incomplete separation of phases but also eliminates the necessity of using excessively long settling times which have characterized prior extraction procedures. In order to facilitate separation by distillation oxygen-containing compounds boiling below about 160° C. and most preferably between about 70° C. and about 140° C. are preferred. Suitable alcohols include methyl, ethyl, normal or isopropyl, normal or iso- or secondary or tertiary butyl or the like, while either diethyl, methylethyl, di normal propyl or isopropyl, ethyl-isopropyl, or like higher ethers or mixtures thereof may be used. The methyl, ethyl, normal or isopropyl, tertiary butyl and like esters of formic, acetic, propionic, butyric, isobutyric and like acids are suitable emulsion preventing esters. Ketones which may be similarly used are, for example, acetone, methyl-ethyl ketone, mesityl oxide, diethyl ketone, methyl-tertiary-butyl ketone and the like. The amount of oxygen-containing organic compound which will be required in order to prevent emulsification in any particular case will vary depending upon the particular oxygen-containing compound chosen, the nature and concentration of the capillary-active compound present in the aqueous solution being treated, the temperature at which the extraction is carried out, the proportion of hydrocarbon solvent to aqueous solution and like variable factors. Suitable proportions may be roughly determined prior to actual operations by agitating a small amount of the aqueous solution to be purified with varying amounts of the chosen solvent and oxygen-containing organic compound and noting the time required for clean separation of the resulting phases.

Any suitable extraction procedure may be used in applying the principles of the process of my invention. The process may be carried out as a batch, intermittent or continuous operation. I preferably employ continuous methods in industrial scale operations and have found countercurrent continuous extraction entirely satisfactory, altho reflux extraction or other suitable methods may also be used. In my preferred countercurrent procedure, I preferably add the oxygen-containing organic compound chosen, in part to the crude aqueous solution being refined and in part to the solvent being used as extractant, the proportions being so chosen that the concentrations of oxygen-containing compound in these two solutions are those in equilibrium, respectively, with the extract phase and with the raffinate being withdrawn. In this way substantially automatic operation is secured and the necessity for supervision is reduced since there is no substantial interchange of oxygen-containing organic compound between phases and suitable conditions once established can be readily maintained by merely insuring uniformity of flow rates of the material fed to the extractor. It will be apparent, however, that this desirable equilibrium with respect to the oxygen-containing organic component of the phases, is not essential to the successful operation of my process since the transfer of such material from one phase to another during extraction in no way interferes with the removal of impurities by the hydrocarbon and since the oxygen-containing compounds used may be readily separated from the extract and raffinate phases in any case.

It has been found that when the extraction treatment is carried out at higher temperatures smaller quantities of oxygen-containing organic compounds are effective in preventing emulsification than are required at lower temperatures. Since aqueous solutions are always involved in the process of my invention the upper limit of extraction temperature is fixed by the boiling point of water at the operating pressure. The formation of gas bubbles which are conducive to emulsification is preferably to be avoided so account must also be taken of the possible formation of lower boiling mixtures by the water and oxygen-containing compounds or other components present. When carrying out the extraction under atmospheric pressure, temperatures between about 30° C. and about 100° C. are satisfactory depending upon the nature of the hydrocarbons and oxygen-containing organic compounds used. Higher temperatures may be used when superatmospheric pressures are resorted to but this involves more expensive apparatus.

For the purpose of making my invention more clear, it will be described with more particular reference to the removal of polymers from aqueous solutions of sodium alkyl sulfates prepared by absorbing $C_{13}$—$C_{18}$ olefines, obtained by vapor phase cracking of paraffin wax, in $H_2SO_4$ and neutralizing the sulfation product after removal of the excess acid by washing with water. The accompanying drawing is a diagrammatic representation of the steps of my process in one of its modifications particularly suitable for such purifications.

From a storage tank 1, the crude sodium alkyl sulfate solution, for example of about 25% concentration, is fed thru pipe 2 to extraction column 3 at a uniform rate. 100 kgs. per hour was the rate of feed in one particular case which will be used as an illustrative example altho it will be evident that wide variations in the rate are possible without sacrifice of extraction efficiency and that the size of the extraction column is a controlling factor in determining the best rate of feed. The crude aqueous sodium alkyl sulfate solution is preferably diluted in pipe 2 with an alcohol containing mixture introduced from pipe 4. This mixture is added at the rate of 29 kgs. per hour and is made up of the following components:

| | Parts by weight |
|---|---|
| Ethyl alcohol | 75 |
| Water | 14 |
| Gasoline (boiling between 80 and 130° C) | 11 |

The extraction column is maintained at about 75° C. while a countercurrent extraction is carried out by means of a solvent mixture introduced thru pipe 5 at a rate of 33 kgs. per hour from solvent storage tank 6. This gasoline solvent mixture preferably has the following approximate composition:

| | Parts by weight |
|---|---|
| Gasoline (boiling between 80 and 130° C.) | 92.6 |
| Ethyl alcohol | 6.5 |
| Water | 0.9 |

At the top of the extraction column 37 kgs. per hour of extract phase composed of gasoline, alcohol, water and 8.7 kgs. of polymer removed from the sodium alkyl sulfate solution are withdrawn thru line 19 and fed to distillation column 7 where the hydrocarbon polymer impurity is substantially completely removed as bottoms 8 while the distillate of gasoline, alcohol and water is condensed in condenser 9 and passed to liquid separator 10.

Meanwhile 125 kgs. per hour of extracted sodium alkyl sulfate solution containing gasoline, alcohol and water are withdrawn from the bottom of the extraction column thru line 11 and fed via level regulator 12 to another distillation column 13 where 91 kgs. per hour of polymer-free sodium alkyl sulfate solution are removed as bottoms 14. The top product from this distillation made up of substantially all the gasoline and alcohol content of the raffinate phase and some water is condensed in condenser 15 and admixed in separator 10 with the distillate from the extract phase. The combined distillates stratify in separator 10 forming a gasoline rich phase which is withdrawn thru line 16 and returned via pressure vessel 17 and line 18 to solvent storage tank 6 and an alcohol rich phase which is taken off thru line 4 for admixture with more crude sodium alkyl sulfate solution.

By simple control of the top temperature of distilling column 13 it is possible to accurately regulate the quantity of water distilled off so that the separation into layers in separator 10 leads to the desired composition of both upper and lower layers, which, as has already been explained, preferably are such compositions as will produce equilibrium with respect to alcohol content, between the extract phase and the diluted crude feed and between the raffinate and solvent phases respectively.

The process of my invention offers many advantages over prior methods of refining aqueous capillary-active sulfation products, particularly as regards simplicity and economy of operation and efficiency of impurity removal. It is not only capable of wide variation with respect to the type of polybasic acid reaction products which may be so refined, but also the operating arrangement may be greatly modified. For example, it will be obvious that one distillation column, instead of the two shown in the drawing, may be used by merely accumulating raffinate, for example, while accumulated extract is being distilled. Still other changes such as will be apparent to those skilled in the extraction art may be made without departing from the spirit of my invention which is to be regarded as limited only by the terms of the accompanying claims, in which it is my intention to claim all novelty inherent therein as broadly as is possible in view of the prior art.

I claim as my invention:

1. A process of purifying polymer-containing aqueous solutions of salts of alkyl acid sulfates of at least eight carbon atoms per molecule which comprises subjecting said aqueous solution to countercurrent extraction with a hydro-carbon boiling below about 160° C. and containing a water soluble aliphatic alcohol, distilling the resulting extract phase to remove extracted polymer as bottoms, distilling the raffinate to take off overhead said hydrocarbon, said alcohol and water, mixing and stratifying the condensed distillates from both distillations, adding the resulting alcohol rich phase to polymer-containing aqueous alkyl acid sulfate salt solution to be purified and using the hydrocarbon phase as an extractant for the polymer in the resulting mixture.

2. A process of purifying polymer-containing aqueous solutions of salts of alkyl acid sulfates of at least eight carbon atoms per molecule which comprises adding to said aqueous solutions a water soluble aliphatic alcohol, extracting the resulting solution with a countercurrent stream of a mixture of a hydrocarbon and said alcohol, distilling the resulting extract to remove the extracted polymer therefrom as bottoms, distilling off from the raffinate substantially all the hydrocarbon and alcohol content and such a part of the water as will produce a distillate which when condensed and mixed with the condensate from the said extract distillation forms on stratification a hydrocarbon phase containing said alcohol and water which is in substantial equilibrium with respect to alcohol content with the raffinate obtainable by extracting said polymer-containing aqueous alkyl sulfate salt solution admixed with the alcohol rich phase from said stratification with the said corresponding hydrocarbon phase.

3. A process of producing polymer-free alkyl acid sulfate salts from neutralized polymer-containing absorption products of olefines of at least eight carbon atoms per molecule in aqueous sulfuric acid which comprises adding about 29% by weight of a water soluble alcohol containing diluent thereto, extracting the resulting mixture with a hydrocarbon boiling at a lower temperature than said polymer and containing an amount of said alcohol which is in equilibrium with the alcohol content of said mixture, separately distilling the resulting extract and raffinate phases to separate as the respective bottom products the extracted polymer and aqueous alkyl acid sulfate salt solution of about the same concentration on a polymer-free basis as the said neutralized polymer-containing absorption product, combining and stratifying the condensates from the two distillations and using the resulting alcohol rich phase as the said alcohol containing diluent and the corresponding hydrocarbon rich phase as the said extractant.

4. A process of purifying aqueous solutions of capillary active aliphatic polybasic inorganic acid esters of at least eight carbon atoms per molecule and salts of such acid esters containing impurities preferentially soluble in hydrocarbons which comprises adding to such an aqueous solution an aqueous lower boiling compound of the class consisting of alcohols, ethers, esters and ketones which aqueous lower boiling compound contains dissolved hydrocarbon, subjecting the resulting mixture to counter current extraction with a hydrocarbon solvent for said impurities which boils below the boiling point of said impurities and contains a substantial amount of said lower boiling compound, distilling the resulting extract and raffinate phases to remove as bottom products respectively extracted impurities and an aqueous solution of said capillary active compound, combining and stratifying the condensed distillates adding the resulting phase rich in said lower boiling compound to the aqueous solution of capillary compound to be purified and using the hydrocarbon phase as the extractant therefor in said counter current extraction whereby emulsification is substantially prevented at both exits of the extractor.

5. A process of purifying aqueous solutions of capillary active polybasic inorganic acid alkyl esters of at least eight carbon atoms per molecule and salts of such acid esters containing impurities preferentially soluble in hydrocarbons which comprises adding to such an aqueous solution sufficient of a lower boiling compound of the class consisting of alcohols, ethers, esters and ketones to prevent substantial emulsification of hydrocarbon by said aqueous solution when the latter is first contacted with a hydrocarbon, subjecting the resulting mixture to counter current extraction with a hydrocarbon solvent for said impurities which solvent contains sufficient of said lower boiling compound to prevent substantial emulsion formation when said hydrocarbon solvent is initially contacted with said solution and separately distilling the resulting extract and raffinate phases to separate therefrom respectively extracted impurities and purified capillary active compound.

ANTON JOHAN TULLENERS.